United States Patent
MacLeod

(10) Patent No.: US 8,535,049 B2
(45) Date of Patent: Sep. 17, 2013

(54) HOT-RUNNER SYSTEM INCLUDING MELT-FLOW CONTROL STRUCTURE INTEGRALLY FORMED WITH THE MANIFOLD BODY

(75) Inventor: Darrin Albert MacLeod, Jeffersonville, VT (US)

(73) Assignee: Husky Injection Molding Systems, Ltd., Bolton, Ontario (CA)

( * ) Notice: Subject to any disclaimer, the term of this patent is extended or adjusted under 35 U.S.C. 154(b) by 35 days.

(21) Appl. No.: 13/357,750

(22) Filed: Jan. 25, 2012

(65) Prior Publication Data

US 2012/0156323 A1 Jun. 21, 2012

Related U.S. Application Data

(63) Continuation-in-part of application No. PCT/US2010/051992, filed on Oct. 8, 2010.

(60) Provisional application No. 61/267,856, filed on Dec. 9, 2009.

(51) Int. Cl.
  *B29C 45/22* (2006.01)
(52) U.S. Cl.
  USPC ........................................ 425/572; 264/328.8
(58) Field of Classification Search
  USPC ........................................ 425/572; 264/328.8
  See application file for complete search history.

(56) References Cited

U.S. PATENT DOCUMENTS

| | | | |
|---|---|---|---|
| 4,575,330 A | 3/1986 | Hull | |
| 4,648,546 A | 3/1987 | Gellert | |
| 4,831,230 A | 5/1989 | Lemelson | |
| 4,929,402 A | 5/1990 | Hull | |
| 5,121,329 A | 6/1992 | Crump | |
| 5,204,055 A | 4/1993 | Sacks et al. | |
| 5,545,028 A * | 8/1996 | Hume et al. | 425/549 |
| 5,775,402 A | 7/1998 | Sacks | |
| 6,089,468 A | 7/2000 | Bouti | |
| 6,382,528 B1 * | 5/2002 | Bouti | 425/567 |
| 6,544,028 B2 | 4/2003 | Wright et al. | |
| 6,572,361 B2 | 6/2003 | Gould et al. | |
| 6,701,997 B2 | 3/2004 | Gellert et al. | |
| 6,796,786 B2 | 9/2004 | White et al. | |
| 7,047,098 B2 | 5/2006 | Lindemann et al. | |
| 7,220,380 B2 | 5/2007 | Farr et al. | |
| 7,234,930 B2 | 6/2007 | Niewels et al. | |
| 7,326,377 B2 | 2/2008 | Adams | |
| 7,381,360 B2 | 6/2008 | Oriakhi et al. | |
| 7,614,872 B2 | 11/2009 | Olaru et al. | |
| 2004/0169699 A1 | 9/2004 | Hunter et al. | |
| 2006/0261521 A1 * | 11/2006 | Beaumont | 264/328.12 |

(Continued)

FOREIGN PATENT DOCUMENTS

EP 0863806 11/1996

OTHER PUBLICATIONS

Advanced Composites Bulletin, Solid Free-Form Fabrication of Reinforced Plastics, Issue: Oct. 2005 on p. 10.
A technical journal: High Performance Plastics, Freedom Fabrication for Prototyping, Issue: Oct. 2005 on p. 5.

(Continued)

*Primary Examiner* — Tim Heitbrink

(57) ABSTRACT

A hot-runner system is provided with a manifold body including a manifold melt channel, and a melt-flow control structure communicating with the manifold melt channel. The melt-flow control structure is integrally formed with the manifold body.

19 Claims, 12 Drawing Sheets

(56) References Cited

U.S. PATENT DOCUMENTS

| | | |
|---|---|---|
| 2007/0071846 A1* | 3/2007 | Xue et al. .................... 425/572 |
| 2007/0104824 A1 | 5/2007 | Blundy |
| 2009/0108500 A1 | 4/2009 | Jenko |
| 2009/0192835 A1 | 7/2009 | Baumann et al. |

OTHER PUBLICATIONS

Gilbert Chan, A technical publication: Hot Runners—Plate technology for designing and building Manifolds. Publication date: Apr. 2007.

International Search Report Dec. 3, 2010.

* cited by examiner

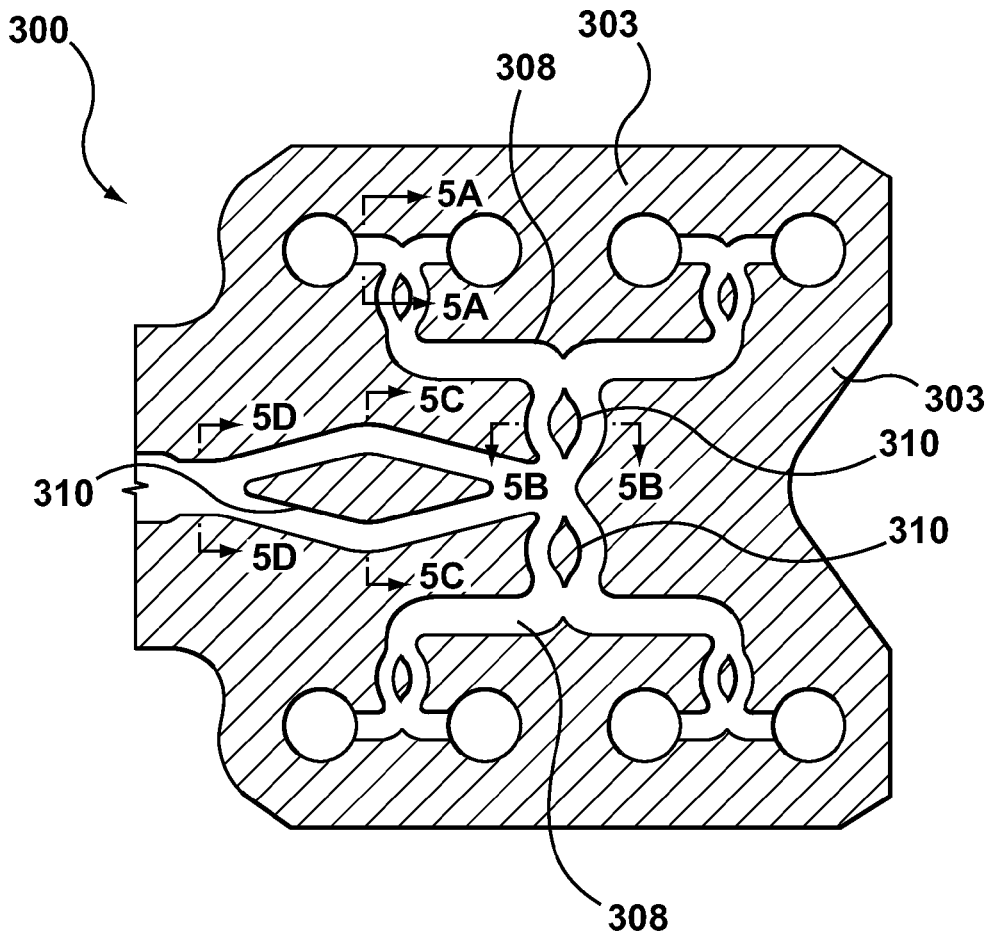
FIG. 4
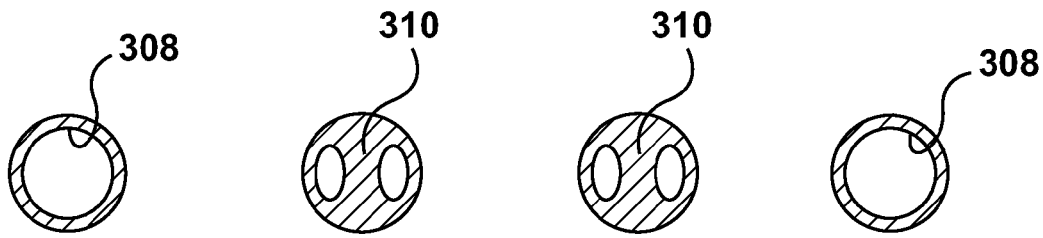
FIG. 5A  FIG. 5B  FIG. 5C  FIG. 5D

HOT-RUNNER SYSTEM INCLUDING MELT-FLOW CONTROL STRUCTURE INTEGRALLY FORMED WITH THE MANIFOLD BODY

RELATED APPLICATIONS

This application is a continuation-in-part of PCT Application No. PCT/US10/51992 entitled "HOT-RUNNER SYSTEM INCLUDING MELT-FLOW CONTROL STRUCTURE MACHINED INTEGRAL TO MANIFOLD BODY" filed Oct. 8, 2010, which is herein incorporated by reference in its entirety, which claims the benefit of U.S. Provisional Application Ser. No. 61/267,856 filed on Dec. 9, 2009, which is herein incorporated by reference in its entirety.

TECHNICAL FIELD

An aspect of the present invention generally relates to (by example, but is not limited to) a hot-runner system including (but is not limited to) a manifold assembly having a melt-flow control structure interfacing with a manifold melt channel, and the melt-flow control structure is integrally formed with the manifold body. The aspects are described in the independent claims.

BACKGROUND

The first man-made plastic was invented in Britain in 1851 by Alexander Parkes. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley Hyatt developed a plastic material he named Celluloid, improving on Parkes' invention so that it could be processed into finished form. Hyatt patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson Hendry built the first screw injection machine. This machine also allowed material to be mixed before injection, so that colored or recycled plastic could be added to virgin material and mixed thoroughly before being injected. In the 1970s, Hendry went on to develop the first gas-assisted injection molding process.

Injection molding machines include a material hopper, an injection ram or screw-type plunger, and a heating unit. They are also known as presses, and they hold the molds in which the components are shaped. Presses are rated by tonnage, which expresses the amount of clamping force that the machine can exert. This force keeps the mold closed during the injection process. Tonnage can vary from less than 5 tons to 6000 tons, with the higher figures used in comparatively few manufacturing operations. The total clamp force needed is determined by the projected area of the part being molded. This projected area is multiplied by a clamp force of from 2 to 8 tons for each square inch of the projected area. As a rule of thumb, 4 or 5 tons per square inch can be used for most products. If the plastic material is very stiff, it will require more injection pressure to fill the mold, thus more clamp tonnage to hold the mold closed. The required force can also be determined by the material used and the size of the part, since larger parts require a higher clamping force. With injection molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled.

Mold assembly or die are terms used to describe the tooling used to produce plastic parts in molding. The mold assembly is used in mass production where thousands of parts are produced. Molds are typically constructed from hardened steel, etc.

Hot-runner systems are used in molding systems, along with mold assemblies, for the manufacture of plastic articles. Usually, hot-runner systems and mold assemblies are treated as tools that may be sold and supplied separately from molding systems.

It is known to use hot-runner systems in injection molding systems.

U.S. Pat. No. 4,831,230 (Inventor: Lemelson, Jerome H.; Filed: Nov. 26, 1986) discloses "an apparatus and method for shaping and surface finishing articles and material of manufacture by means of intense radiation."

U.S. Pat. No. 4,929,402 (Inventor: Hull, Charles W.; Filed: 19 Apr. 1989) discloses "a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction, successive adjacent laminae, representing corresponding successive adjacent cross-sections of the object, being automatically formed and integrated together to provide a step-wise laminar buildup of the desired object, whereby a three-dimensional object is formed and drawn from a substantially planar surface of the fluid medium during the forming process."

U.S. Pat. No. 4,575,330 (Inventor: Hull, Charles W; Filed: 8 Aug. 1984) discloses "a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction, successive adjacent laminae, representing corresponding successive adjacent cross-sections of the object, being automatically formed and integrated together to provide a step-wise laminar buildup of the desired object, whereby a three-dimensional object is formed and drawn from a substantially planar surface of the fluid medium during the forming process."

U.S. Pat. No. 5,204,055 (Inventor: Sachs, Emanuel M., et al.; Filed: 8 Dec. 1989) discloses "a process for making a component by depositing a first layer of a fluent porous material, such as a powder, in a confined region and then depositing a binder material to selected regions of the layer of powder material to produce a layer of bonded powder material at the selected regions. Such steps are repeated a selected number of times to produce successive layers of selected regions of bonded powder material so as to form the desired component. The unbonded powder material is then removed. In some cases the component may be further processed as, for example, by heating it to further strengthen the bonding thereof."

U.S. Pat. No. 5,121,329 (Inventor: Crump, Scott S., Filed: 30 Oct. 1989) discloses "apparatus incorporating a movable dispensing head provided with a supply of material which solidifies at a predetermined temperature, and a base member, which are moved relative to each other along "X," "Y," and "Z" axes in a predetermined pattern to create three-dimensional objects by building up material discharged from the dispensing head onto the base member at a controlled rate. The apparatus is preferably computer driven in a process utilizing computer aided design (CAD) and computer-aided (CAM) software to generate drive signals for controlled movement of the dispensing head and base member as material is being dispensed. Three-dimensional objects may be produced by depositing repeated layers of solidifying material until the shape is formed. Any material, such as self-hardening waxes, thermoplastic resins, molten metals, two-part epoxies, foaming plastics, and glass, which adheres to the previous layer with an adequate bond upon solidification, may be utilized. Each layer base is defined by the previous layer, and each layer thickness is defined and closely controlled by the height at which the tip of the dispensing head is positioned above the preceding layer."

U.S. Pat. No. 5,775,402 (filed: Oct. 31, 1995; Inventor: Emanuel Sachs) discloses processes for providing enhanced thermal properties of tooling, particularly metal and metal/ceramic molds, made by solid free form fabrication techniques, such as the three dimensional printing process, and the tooling made by these processes are disclosed. The methods of enhancing thermal properties include incorporating integral contour coolant channels into the mold, adding surface textures to the coolant channels, creating high thermal conductivity paths between the surfaces and the coolant channels, and creating low thermal inertia regions in the mold.

European Patent Number 0863806 (Inventor: Freitag, et al.; Filed: 26 Nov. 1996) discloses "manufacturing of solid three-dimensional articles, and is more specifically directed to the additive fabrication of metal articles such as parts and mold dies."

U.S. Pat. No. 7,047,098 (Inventor: Lindemann, Markus, et al.; Filed: 21 Feb. 2002) discloses "a process for producing a shaped body by selective laser melting, in which a shaped body is built up from pulverulent metallic material using CAD data of a model, in which a powder layer is applied using an applicator unit, and in which the applied powder layer is fixed to a layer below it using a focused laser beam, in which process the powder layer is leveled to a desired layer thickness as a result of a leveling device passing over the shaped body at least once, and during the leveling elevations that project above the desired layer height of the applied powder, of the layer which was last melted by the laser beam are uncovered by the leveling device."

U.S. Pat. No. 7,381,360 (Inventor: Oriakhi, Christopher, et al.; Filed: 3 Nov. 2003) discloses "compositions, methods, and systems for solid free-form fabrication of three-dimensional objects."

U.S. Pat. No. 7,220,380 (Inventor: Farr, Isaac, et al.; Filed: 14 Oct. 2003) discloses "a method for solid free-form fabrication of a three-dimensional metal object includes depositing a particulate blend in a defined region, the particulate blend including a number of metal or metal alloy particulates and a peroxide, and selectively ink-jetting a binder system onto a predetermined area of the particulate blend to form a green part, wherein the liquid phase binder includes a water soluble monofunctional acrylate-based monomer, a water soluble difunctional acrylate-based monomer, an amine, and water."

United States Patent Publication Number: 2004/0079511 and U.S. Pat. No. 6,701,997 (filed 17 Jun. 2002; Inventor: Gellert, Jobst U, et al.) discloses: "(i) a process for fabricating an injection molding component having an electrical heating attached thereto, the process comprising the steps of: contacting the electrical heating element with a powdered metal preform having at least partial open porosity, the powdered metal preform being composed of a first metal; contacting the preform adjacent a region of the open porosity with a mass of a second metal, the second metal having higher thermal conductivity than the first metal; heating the preform, the heating element and the mass so as to cause the second metal to at least partially infiltrate the open porosity of the preform and at least partially join the heating element to the preform when cooled, (ii) a process for fabricating a metal part having at least two components, the process comprising the steps of: making a powdered preform of a first component, the preform having at least partial open porosity; contacting a second component with the preform of the first component; and infiltrating the open porosity of preform with a second metal wherein the second component is brazed to the first component by the second metal substantially contemporaneously with the infiltration step, (iii) a process for fabricating a metal part having at least two components, the process comprising the steps of: making a powdered preform of a first component, the preform having at least partial open porosity; contacting a second component with the preform of the first component to form an assembly thereof; contacting the preform first component with a mass of a metal infiltrant; controllably heating the assembly and the metal infiltrant to melt the metal infiltrant; holding the assembly and the metal infiltrant at temperature until the open porosity of the preform of the first component is at least partially infiltrated by the metal infiltrant and the second component is at least partially brazed to the first component by the metal infiltrant; and controllably cooling the assembly to solidify the metal infiltrant, and (iv) a process for fabricating an injection molding component, the process comprising the steps of: mixing a powdered tool steel with a binder to form an admixture; injecting the admixture into a preform; debinderizing the preform; partially sintering the preform to achieve 40% to 10% volume open porosity therein; contacting the preform with a metal infiltrant, the metal infiltrant having high thermal conductivity; controllably heating the preform and the metal infiltrant to at least the melting temperature of the metal infiltrant; holding the preform and the metal infiltrant at temperature until the porosity of the first component is at least partially infiltrated by the metal infiltrant, and cooling the preform to solidify the metal infiltrant and yield the injection molding component."

United States Patent Publication Number 2004/0169699 (Inventor: Hunter, Shawn, et al.; Filed: 28 Feb. 2003) discloses "a method of producing an object through solid freeform fabrication, said method comprising applying two immiscible fluids to a build material."

U.S. Pat. No. 7,234,930 (Inventor: Niewels, et al; Filed: 14 Jun. 2004) discloses "a second piece is formed by a three-dimensional printing process or other powder forming technique such as investment casting. The three dimensional printing process or other powder forming techniques permit the formation of ideal cooling channels within the structure. This provides a neck ring half with high strength provided by the first piece and high thermal conductivity provided by the second piece."

U.S. Pat. No. 7,326,377 (Inventor: Adams, Robbie J; Filed: 30 Nov. 2005) discloses "a solid free form fabrication system for manufacturing a component by successively building feedstock layers representing successive cross-sectional component slices includes a platform for receiving and supporting the feedstock layers, a feedstock supplying apparatus that deposits the feedstock into a predetermined region to form the feedstock layers, an energy source directed toward the predetermined region to modify the feedstock in the predetermined region and thereby manufacture the component, and a temperature control block disposed on the platform and directly in contact with the deposited feedstock layers to modify the feedstock temperature while manufacturing the component. A solid free form fabrication method uses the system to manufacture the component from the feedstock material."

United States Patent Publication Number 2005/0186538 (Inventor: Uckelmann, Ingo; Filed: 24 Feb. 2005) discloses "a method for making metallic and/or non-metallic products 2, in particular dental products, by freeform sintering and/or melting."

United States Patent Publication Number: 2009/0108500 (filing date: 31 Oct. 2007, inventor: Edward Joseph Jenko) discloses "Additionally, a low strength manifold, such as one made with low grade steel or through free form fabrication, can be used in the production of such molded pieces requiring high pressure injection.

United States Patent Publication number: US 2009/0192835 (filing date: 24 Jan. 2008; Inventor: Martin H. Baumann et al) discloses at paragraph [0023] "Additionally, a low strength manifold, such as one made with low grade steel or through free form fabrication, can be used in the production of such molded pieces requiring high pressure injection."

A technical journal titled: HIGH PERFORMANCE PLASTICS (Issue: October 2005 on page 5; Title of Article: FREEFORM FABRICATION FOR PROTOTYPING) discloses "US researchers are developing an automated prototyping process in which an advanced composite is formed into a freestanding, three-dimensional object. The technique—called composite layer manufacturing (CLM)—does not require moulds, dies or other tooling. In addition, there is usually no need for machining, as the process creates net-shapes, the developers say."

A technical journal titled: ADVANCED COMPOSITES BULLETIN (Issue: October 2005 on page: 10; Title of Article: SOLID FREE-FORM FABRICATION OF REINFORCED PLASTICS) discloses: "US researchers are developing an automated prototyping process in which an advanced composite is formed into a freestanding, three-dimensional object. The technique—called composite layer manufacturing (CLM)—does not require moulds, dies or other tooling. In addition, there is usually no need for machining, as the process creates netshapes, the developers say."

A technical publication titled: HOT RUNNERS—PLATE FUSING TECHNOLOGY FOR DESIGNING AND BUILDING MANIFOLDS (Publication Date: April 2007; Author: Gilbert Chan; Publication: www.moldmakingtechnology.com) discloses how plate fusing technology can benefit the mold designer and mold maker. Specifically, most hot runner manifolds are plug style manifolds where the manifold starts out as a solid plate of steel and straight flows are gun drilled into the plate to create intersecting flow channels. Hot runner channel plugs are then used to plug the drilled holes and to create the final flow path. Manifolds manufactured in this fashion are limited to straight flows, hard 90-degree turns in flow, and typically contain steps between the flow channels and the plugs, which can create hold up areas for the material. A secondary operation to polish the manifold channel intersections involves using a slurry to smooth the flow surfaces, but because this is a blind method, smooth flows without steps are not always guaranteed. The plate-fusing technology provides a method for building a manifold. As the name suggests, plate fusing technology uses separate steel plates that are fused together to create a solid manifold. The process starts out with two or more plates. Flow channels are machined in the faces of the steel. These will become the internal surfaces of the manifold melt channel. These channels will be machined on a CNC (computer numerical control) mill with ball end mills to produce smooth, rounded flow channels with flowing radii at the transitions in the x-y plane but not in the z plane. The channels can vary in size and can travel between the levels of the plates but transitions from x-y plane to the z plane will still have abrupt or "hard" 90-degree turns.

SUMMARY

The inventor believes that persons of skill in the art are not aware of the problem(s) associated with hot-runner systems. Known hot-runner systems include a manifold, and even though the manifold is, more or less, geometrically balanced, the manifold does not deliver a molten resin (also known as the "melt") with a uniform rheology to all output nozzles (sometimes referred to as "drops") of the manifold. One problem is the shear profile that is generated as the melt flows through a manifold channel (sometimes called a melt-channel). The shear profile splits unevenly at intersections in the melt stream causing resin of higher temperature to flow in one direction and cooler resin to flow in the opposing direction. The shear profile may be improved (for example) with the addition of a mixing element, melt flipper or a melt splitter. The biggest problem with mixing elements and melt splitters is that in the current state of the art these items are separate pieces or components (also known as "inserts") that need to be installed inside the manifold. These mixers are difficult to install due to their size, specific orientation, length, etc. The known mixers, flippers, and splitters are generic designs, and are not optimally designed for every manifold layout, or process.

According to one aspect, there is provided a hot-runner system. The hot-runner system includes a manifold body including a manifold melt channel and a melt-flow control structure communicating with the manifold melt channel, where the melt-flow control structure is integrally formed with the manifold body.

According to another aspect, there is provided a hot-runner system, including a manifold assembly, having a manifold body including a manifold melt channel, and a melt-flow control structure communicating with the manifold melt channel, the melt-flow control structure being configured to control, at least in part, a flow of melted resin through the manifold melt channel, wherein the melt-flow control structure is integrally formed with the manifold body.

According to yet another aspect, there is provided a hot-runner system, including a manifold assembly, having: (i) a first manifold body; (ii) a second manifold body being connectable with the first manifold body, the first manifold body and the second manifold body, together, defining a manifold melt channel when connected; and (iii) a melt-flow control structure communicating with the manifold melt channel, the melt-flow control structure being configured to control, at least in part, a flow of melted resin through the manifold melt channel, wherein the melt-flow control structure is integrally formed with the second manifold body.

According to another aspect, a method of making a hot-runner system is provided. The method includes providing a manifold body that includes a first manifold body portion and a second manifold body portion, providing a manifold melt channel in the manifold body and machining a melt-flow control structure integrally with the manifold body, the melt-flow control structure communicating with the manifold melt channel. The method further includes connecting together the first manifold body portion and the second manifold body portion to form the manifold melt channel and the melt-flow control structure.

Other aspects and features will now become apparent to those skilled in the art upon review of the following detailed description of the non-limiting embodiments with the accompanying drawings.

DETAILED DESCRIPTION OF THE DRAWINGS

The invention will be more fully appreciated by reference to the following detailed description of the non-limiting embodiments when taken in conjunction with the accompanying drawings, in which:

FIG. 4 is a schematic representation of another embodiment of a hot-runner system;

FIGS. 5A-5D are schematic representations of cross-sectional views shown in FIG. 4;

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

Figure 1:
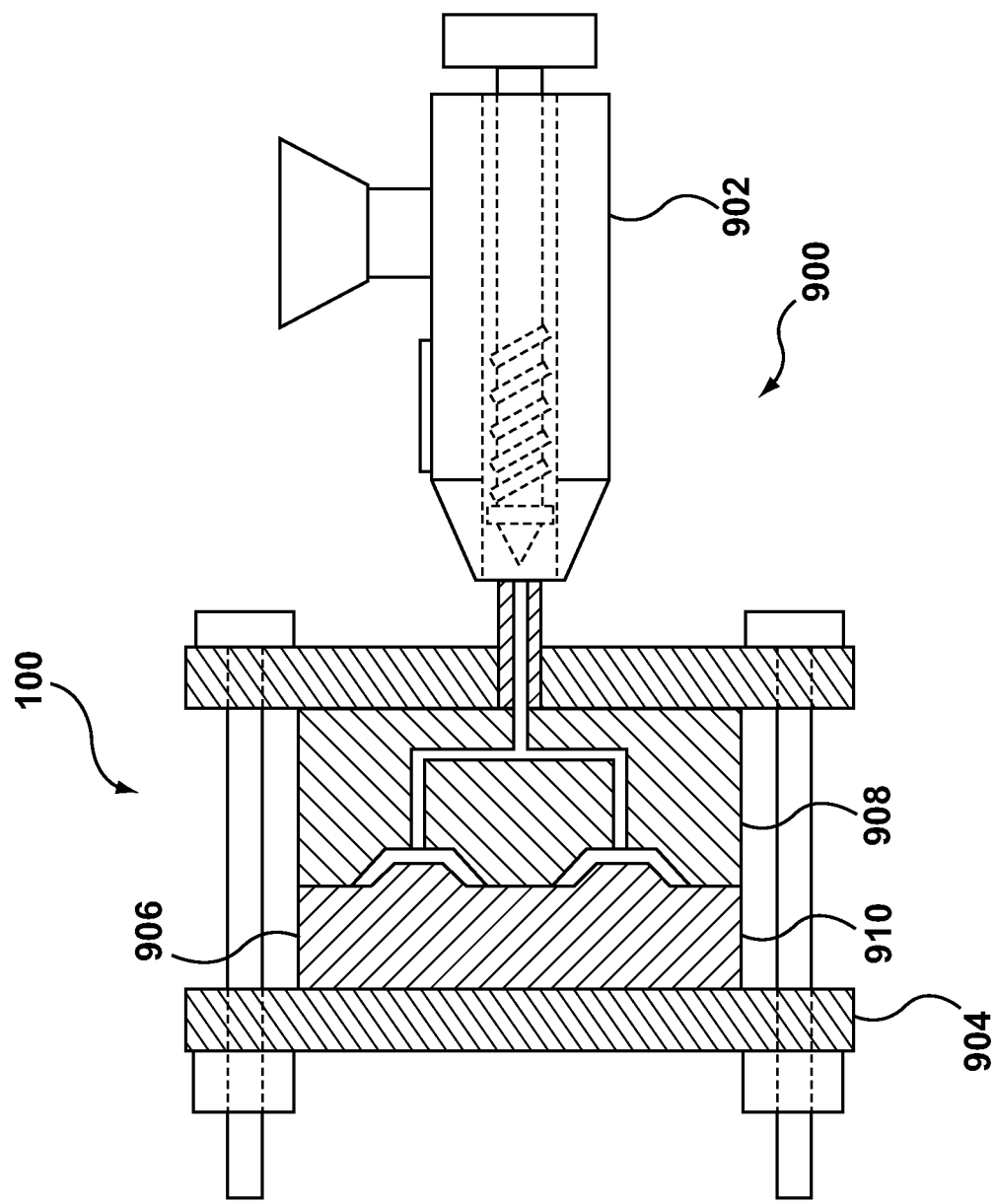
FIG. 1 is a schematic representation of one embodiment of a hot-runner system and an injection-molding system.

FIG. 1 is a schematic representation of a hot-runner system (100) and an injection-molding system (900). The injection-molding system (900) includes (but is not limited to): (i) an extruder assembly (902), (ii) a clamping assembly (904), (iii) a mold assembly (906), and the hot-runner system (100). The mold assembly (906) includes (but is not limited to: a movable mold portion (910) and a stationary mold portion (908). The hot-runner system (100) and the injection-molding system (900) may include (but are not limited to) components that are known to persons skilled in the art, and these known components will not be described here; these known components are described, at least in part, in the following reference books (for example): (i) "*Injection Molding Handbook*" authored by Osswald/Turng/Gramann (ISBN: 3-446-21669-2), (ii) "*Injection Molding Handbook*" authored by Rosato and Rosato (ISBN: 0-412-99381-3), (iii) "*Injection Molding Systems*" 3$^{rd}$ Edition authored by Johannaber (ISBN 3-446-17733-7) and/or (iv) "*Runner and Gating Design Handbook*" authored by Beaumont (ISBN 1-446-22672-9).

Figure 2A:
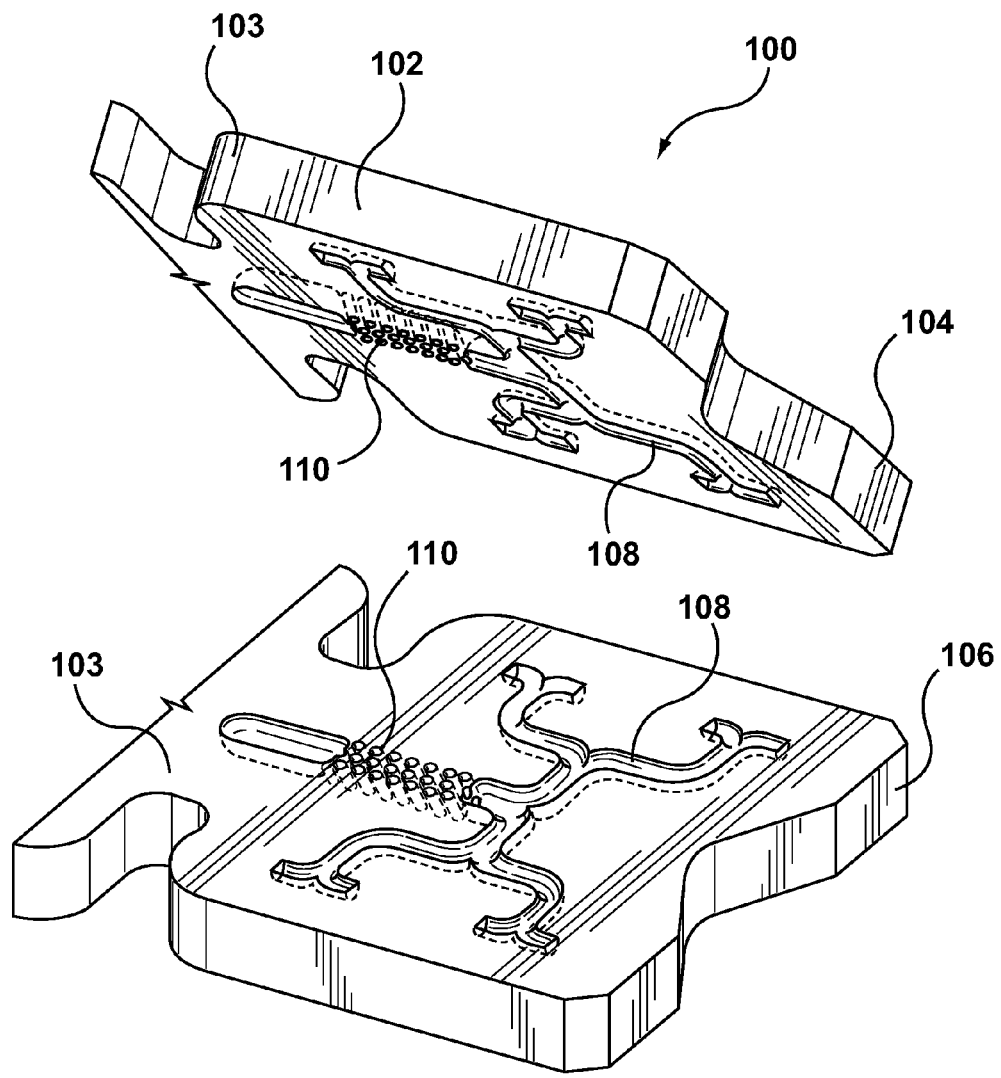
FIG. 2A is a schematic representation of the hot runner system with the first manifold body separated from the second manifold body.
Figure 2B:
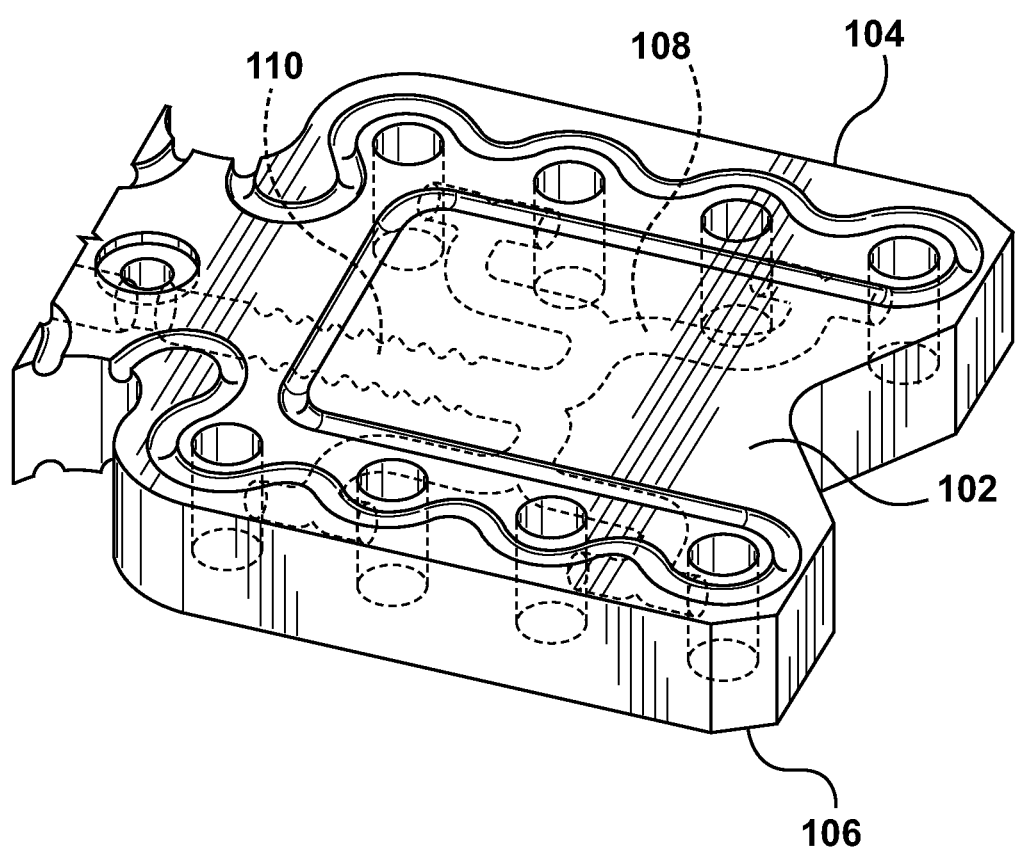
FIG. 2B is a schematic representation of the hot runner system shown in FIG. 2A with the first manifold body joined with the second manifold body.

FIGS. 2A and 2B are schematic representations of the hot-runner system (100) of FIG. 1 in accordance with a first non-limiting embodiment. Generally, the hot-runner system (100), includes (but is not limited to): (i) a manifold body (103), and (ii) a melt-flow control structure (110). The manifold body (103) includes a manifold melt channel (108). The melt-flow control structure (110) communicates with the manifold melt channel (108). As illustrated, the melt-flow control structure (110) is integrally formed with the manifold body (103).

In one embodiment, the melt-flow control structure (110) is machined integrally with the manifold body (103). The term "integrally formed" means a manufacturing process was used to manufacture the melt-flow control structure (110) of the manifold body (103) during manufacture. In one embodiment, a machine is used to integrally form the melt-flow control structure (110) with the manifold body. One example of a suitable machine is a milling machine. In another embodiment, a machine is not used to integrally form the melt-flow control structure with the manifold body.

An example of a manufacturing method for making the manifold body (103) integrally with the melt-flow control structure (110) is to use a solid freeform fabrication process (SFF), also referred to as an additive manufacturing fabrication process. Solid freeform fabrication is a collection of techniques for manufacturing solid objects by the sequential delivery of energy and/or material to specified points in space to produce that solid. SFF is sometimes referred to as rapid prototyping, rapid manufacturing, layered manufacturing and additive fabrication. It will be appreciated that SFF is sometimes referred to as Free Form manufacturing (FFF).

The following are the techniques for (SFF): (A) Electron beam melting (fully fused void-free solid metal parts from powder stock), (B) Electron beam freeform fabrication (fully fused void-free solid metal parts from wire feedstock), (C) Fused deposition modeling (fused deposition modeling extrudes hot plastic through a nozzle, building up a model), (D) Laminated object manufacturing (sheets of paper or plastic film are attached to previous layers by either sprayed glue, heating, or embedded adhesive, and then the desired outline of the layer is cut by laser or knife. Finished product typically looks and acts like wood), (E) Laser engineered net shaping (a laser is used to melt metal powder and deposit it on the part directly. This has the advantage that the part is fully solid (unlike SLS) and the metal alloy composition can be dynamically changed over the volume of the part), (F) Polyjet matrix (PolyJet Matrix Technology is the first technology that enables simultaneous jetting of multiple types of model materials), (G) Selective laser sintering (selective laser sintering uses a laser to fuse powdered nylon, elastomer, or metal. Additional processing is necessary to produce fully dense metal part), (H) Shape deposition manufacturing (part and support material are deposited by a printhead and then machined to near-final shape), (I) Solid ground curing (shines a UV light on an electrostatic mask to cure a layer of photopolymers, uses solid wax for support), (J) Stereolithography (stereolithography uses a laser to cure liquid photopolymers), (K) Three-dimensional printing (this label encompasses many technologies of modern 3D Printers, all of which use inkjet-like printheads to deposit material in layers. Commonly, this includes (but is not limited to) thermal phase change inkjets and photopolymer phase change inkjets), and/or (L) Robocasting (robocasting refers to depositing material from a robotically controlled syringe or extrusion head). U.S. Pat. No. 7,381,360, U.S. Pat. No. 7,220,380, U.S. Pat. No. 7,326,377, and U.S. Published Application No. 2004/0169699 are referenced above in the Background section and all generally disclose the solid freeform fabrication process in greater detail, and thus all are herein incorporated by reference in their entirety.

Another example of a manufacturing method for making the manifold body (103) is to use a non-solid freeform fabrication, such as casting. Casting is a manufacturing process by which a liquid material is usually poured into a mold, which contains a hollow cavity of the desired shape, and then allowed to solidify. The solidified part is also known as a casting, which is ejected or broken out of the mold to complete the process. Casting materials are usually metals or various cold setting materials that cure after mixing two or more components together; examples are epoxy, concrete, plaster and clay. Casting is most often used for making complex shapes that would be otherwise difficult or uneconomical to make by other methods.

More specifically, the hot-runner system (100) may include (but is not limited to) a manifold assembly (102). The manifold assembly (102) has the manifold body (103) that includes the manifold melt channel (108). The melt-flow control structure (110) is configured to control, at least in part, a flow of melted resin through the manifold melt channel (108). In one embodiment, the melt-flow control structure (110) is configured as a functional insert. In particular, as set forth above, in the prior art, such inserts were separate pieces or components (also known as "inserts") that need to be installed inside the manifold. In one embodiment, the integrally formed functional insert is configured as a mixing element.

In one embodiment, the manifold body (103) may include (but is not limited to): (i) a first manifold body portion (104), and (ii) a second manifold body portion (106). The second manifold body portion (106) may be connectable with the first manifold body portion (104). The first manifold body portion (104) and the second manifold body portion (106), together define the manifold melt channel (108) when connected. The melt-flow control structure (110) may be integrally formed with the first and/or second manifold body portions.

The melt-flow control structure (110) interacts with or interfaces with melt stream in the manifold melt channel (108). The melt-flow control structure (110) helps to provide a homogeneous melt stream and/or achieve improved balancing of flow in the hot-runner system (100). The melt-flow control structure (110) is integrally formed with the manifold body. In one embodiment, the melt-flow structure is built into or machined directly as part of the manifold body (103) so that the melt-flow control structure (110) directly interacts with the melt stream in the manifold melt channel (108). The advantages are as follows: (1) the geometry of the melt-flow control structure (110) can be customized for the specific pitch, resin, process, and application, (2) the melt-flow control structure (110) can follow the layout of the manifold melt channel (108), (3) the geometry of the melt-flow control structure (110) is built into the manifold body (103) and faces or interacts with the manifold melt channel (108) so that there are no added leak points for the manifold assembly (102), (4) the geometry of the melt-flow control structure (110) may be placed where it will be most effective, and not where the melt-flow control structure (110) best fits, and/or (5) the geometry of the melt-flow control structure (110) may vary from complex ball nosed angle drills to just flattening out the manifold melt channel (108) such that an oval melt channel may be formed or used instead of a round or circular manifold melt channel (108).

The types or structures of the melt-flow control structure (110) that can be manufactured inside the melt channel with the manifold assembly (102) can range from a simple split in the melt stream of the manifold body (103) to a complex cross-drilling type mixer. The melt-flow control structure (110) allows manipulation of the melted resin inside the manifold melt channel (108) such that it may be possible to predict (by using mathematical techniques such as finite element analysis) and control the flow of the melted resin. The melt-flow control structure (110) permits flow control features or structures to be placed in the manifold melt channel (108) where the melt-flow control structure (110) may be the most efficient. The manifold assembly (102) (particularly the two piece design), allows the melt-flow control structure (110) to be formed directly in the manifold body (103) which does not limit the features of the melt-flow control structure (110) in size or shape to the design of the manifold body (103). The features may be tailored to the specific resin, melt channel layout, and processing conditions. The features of the melt-flow control structure (110) may be unique to a particular manifold assembly (102).

FIG. 2A illustrates one embodiment where the melt-flow control structure (110) is formed, in part, in the first manifold body portion (104) (which may be called a top half), and also formed, in part, in the second manifold body portion (106) (which may be called the bottom half).

FIG. 2B illustrates one embodiment of the first manifold body portion (104) and the second manifold body portion (106) joined together to make or form the manifold assembly (102). It will be appreciated that the melt-flow control structure (110) may be formed on only the first manifold body portion (104), or the second manifold body portion (106) or both the first manifold body portion (104) and the second manifold body portion (106). The melt-flow control structure (110) may be formed at any location along the manifold melt channel (108). It will be appreciated that although the melt-flow control structure (110) as depicted in FIG. 2A is shown as a straight element, the melt-flow control structure (110) may also be formed along a curve in the manifold melt channel (108). It will also be appreciated that the melt-flow control structure (110) of FIG. 2B is depicted by way of example at one specific location in the manifold melt channel (108), and that the melt-flow control structure (110) may be formed at multiple locations with varying channel lengths and diameters. The melt-flow control structure (110) may follow the manifold melt channel (108) around a bend or split in the manifold melt channel (108).

Figure 3:
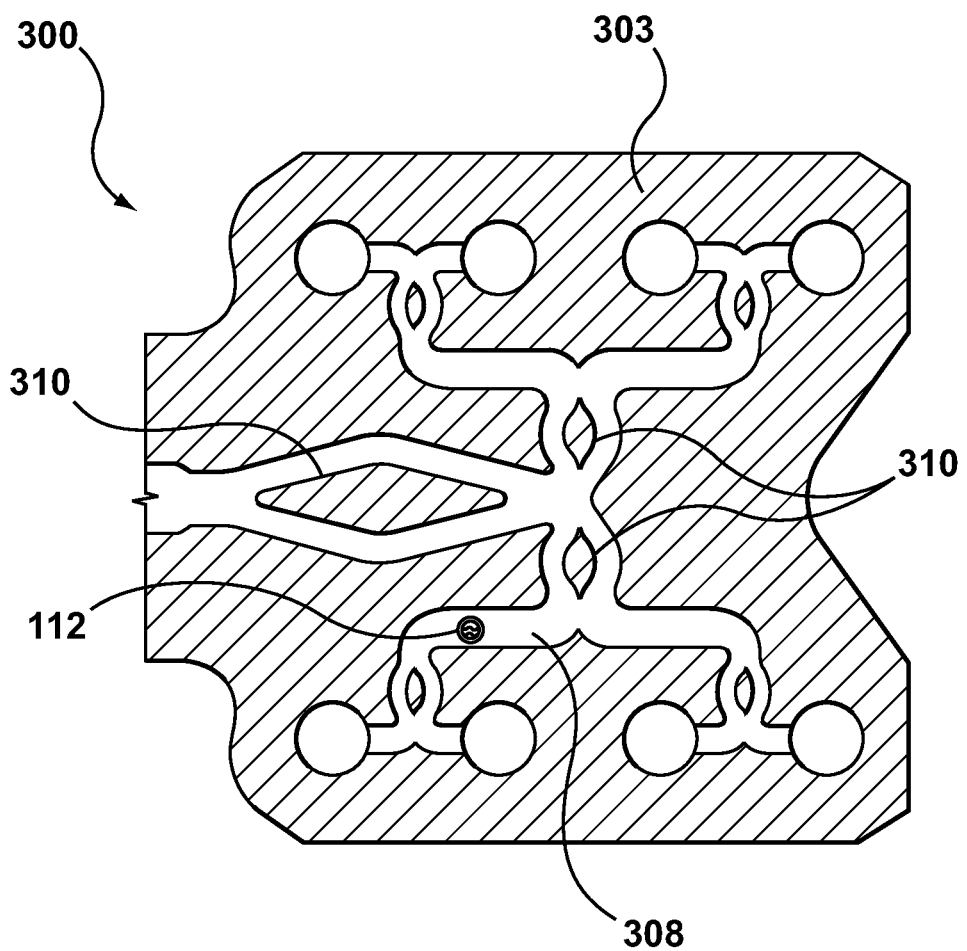
FIG. 3 is a schematic representation of another embodiment of a hot-runner system.

FIG. 3 is a schematic representation of another embodiment of a hot-runner system (300). In this embodiment, the melt-flow control structure (310) is an elongated, diamond shaped structure that is located in the manifold melt channel (308). In this particular embodiment, there are three diamond shaped melt-flow control structures (310) spaced apart from each other in the manifold melt channel (308).

In the embodiment illustrated in FIG. 3, the hot-runner system (300) further includes a melt-flow control structure in form of a functional insert (112) located in the manifold body (303). The functional insert (112) is interactive with the manifold melt channel (308). The functional insert (112) (or one or more functional inserts) may be placed in the manifold melt channel (308), and may be a mixer element (not depicted) and/or a baffle element (not depicted), etc. The functional insert (112) may be integrally formed to the manifold body (303), by using free-form fabrication techniques (previously described). The two halves of the manifold body (303) may be placed and braised together.

In one embodiment, the melt flow control structure (310) described above is configured as a functional insert (112) located in the manifold body, and the functional insert (112) is integrally formed with the manifold body. Alternatively, the functional insert (112) may be manufactured as a component separate from the manifold body (303) (such as, by not using any free-form fabrication techniques per se but using other conventional techniques), and then the functional insert may be placed in the manifold body (303) at a suitable location, and sealed inside the manifold body (303), either by continuing the FFF or by brazing the two halves of the manifold body (303) together. When the functional insert (112) is configured as a mixer element, it may be configured to mix the flow of melted resin through the manifold melt channel (308). When the functional insert (112) is configured as a baffle element, it may be configured to deflect the flow of melted resin through the manifold melt channel (308). The baffle element may be used to even (change, adjust, manipulate) the shear profile (of the flowing melt) before the melt flow becomes split in the manifold melt channel (308). One purpose of changing or manipulating the shear profile of the flowing melt is to create a flow front that has a symmetric shear profile and is consistent from nozzle drop to nozzle drop.

FIG. 4 illustrates the hot-runner system 300 shown in FIG. 3 with multiple cross-sectional views which are illustrated in FIGS. 5A-5D. As shown in FIGS. 5A and 5D, in one embodiment, the melt channel (308) has a substantially circular cross-section. As shown in FIGS. 5B and 5C, in one embodiment, the diamond shaped melt flow control structure (310) alters the cross-sectional shape of the melt channel (308). In one particular embodiment, these melt flow control structures (310) are configured to mix the melt flow by providing an obstruction which the melt flow must travel around. As mentioned above, the melt flow control structure (310) may help to provide a homogeneous melt stream and/or achieve improved thermal balancing of flow in the hot-runner system.

Figure 6:
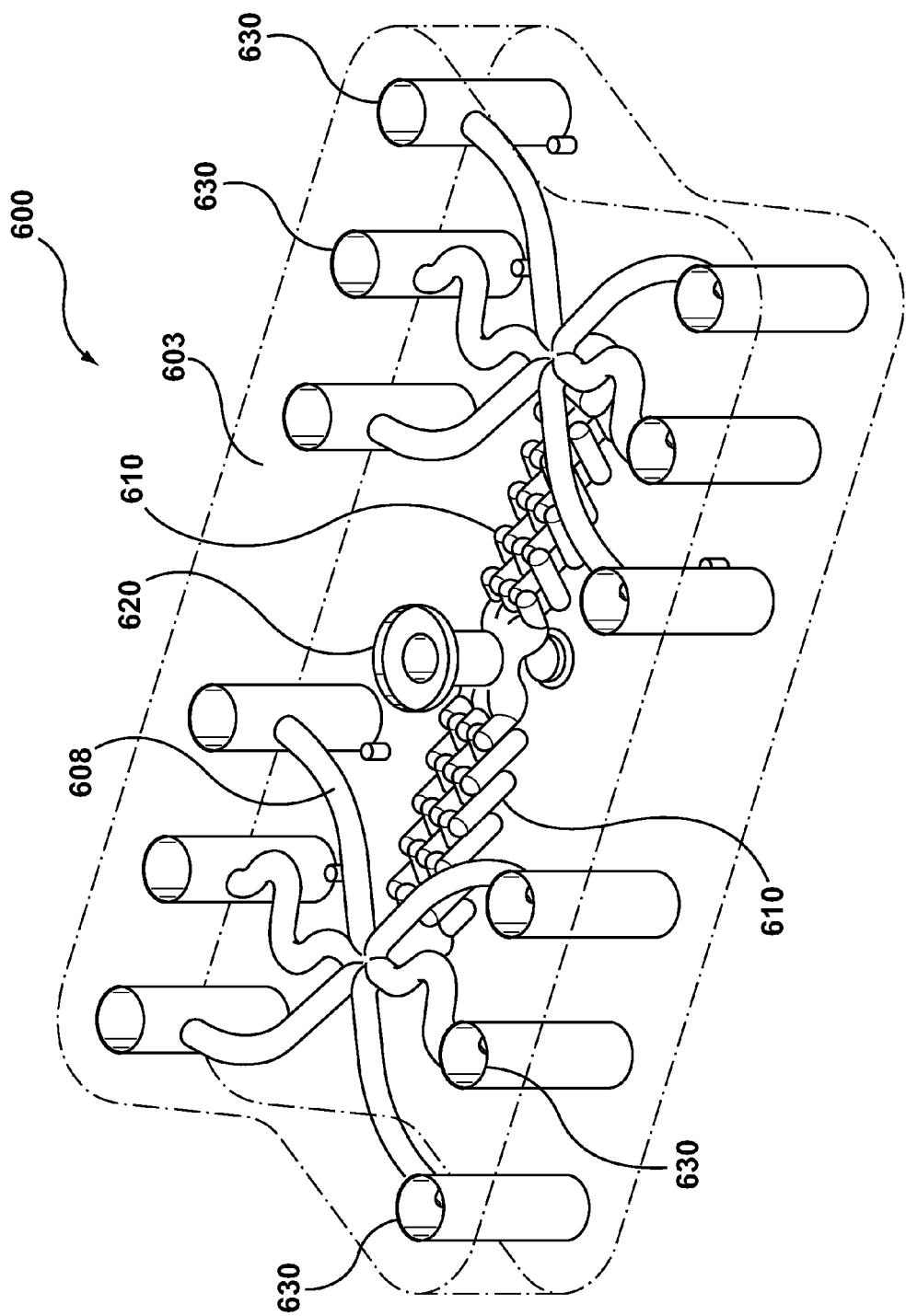
FIGS. 6-8 are schematic representations of another embodiment of a hot-runner system.
Figure 7:
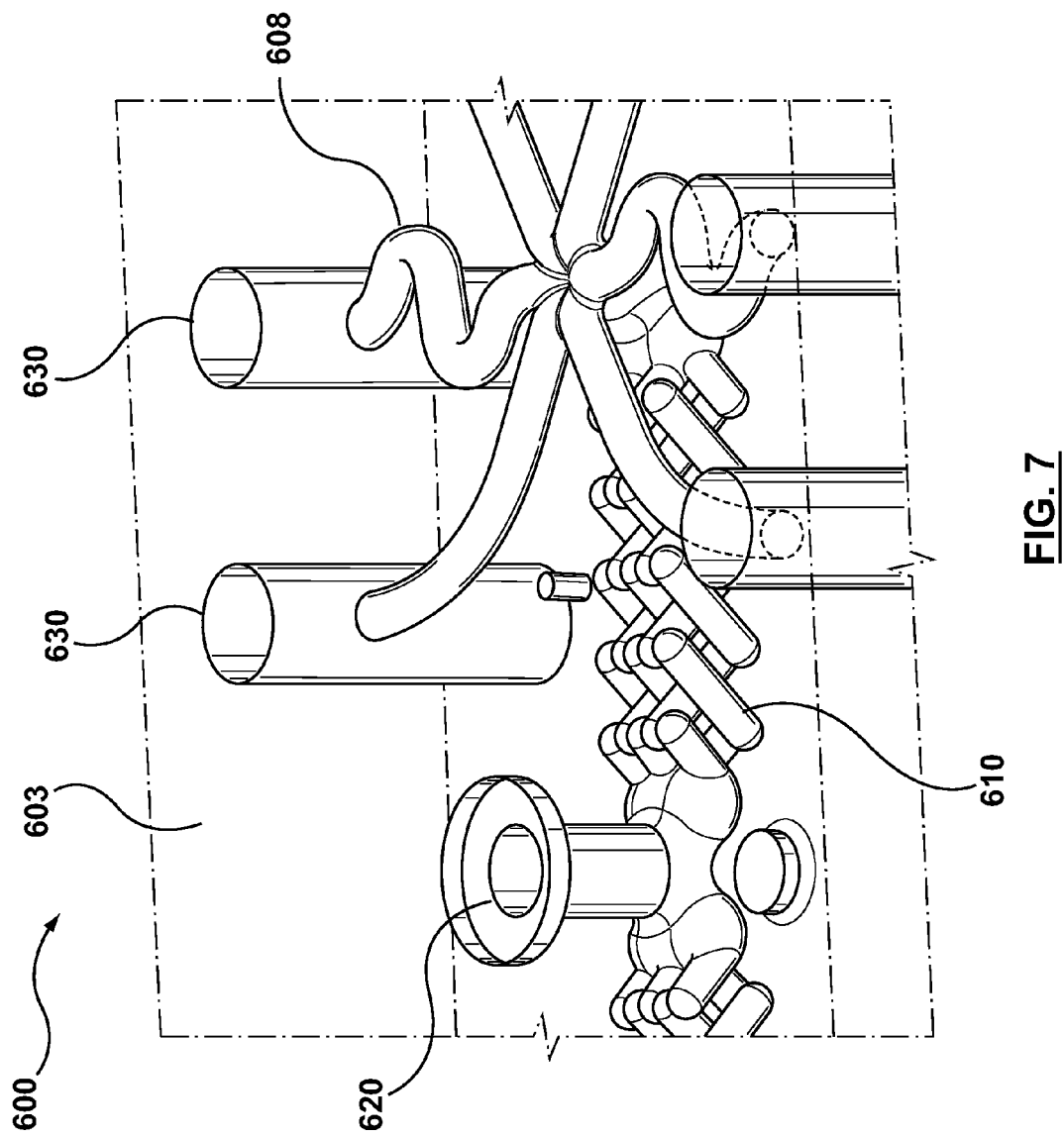
Figure 8:
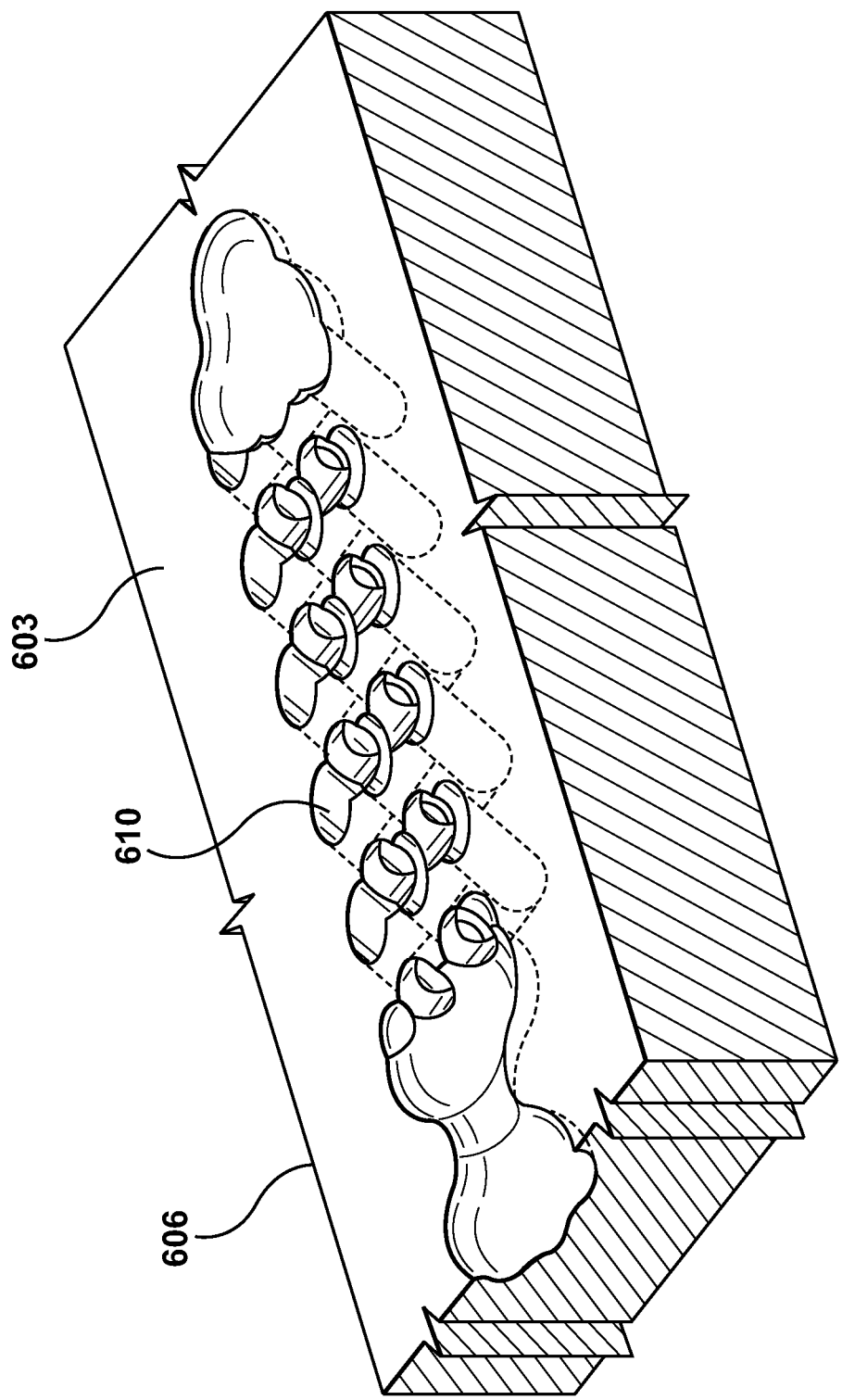

FIGS. 6-8 illustrate another embodiment of a hot-runner system (600). The hot-runner system (600) includes a manifold body (603) with an inlet (620) and a plurality of outlets (630), and a manifold melt channel (608) that extends between the inlet and the outlets. A plurality of melt-flow control structures (610) communicate with the manifold melt channel (608), and the melt-flow control structures (610) are integrally formed with the manifold body (603). In this embodiment, the melt-flow control structures include an array of a plurality of zigzagging and/or substantially undulating channels that are configured to split the melt flow, mix/agitate the melt flow, and then recombine the melt flow to provide a more homogenous melt stream.

As shown in FIG. 8, in one embodiment, the manifold body (603) may include a first manifold body portion (606), and a second manifold body portion (not shown). The first and second manifold body portions (606) may form top and bottom halves that are connectable to together define the manifold melt channel (608). As shown in FIG. 8, the melt-flow control structure (610) may be integrally formed with the first and/or or second manifold body portions (606).

Figure 9:
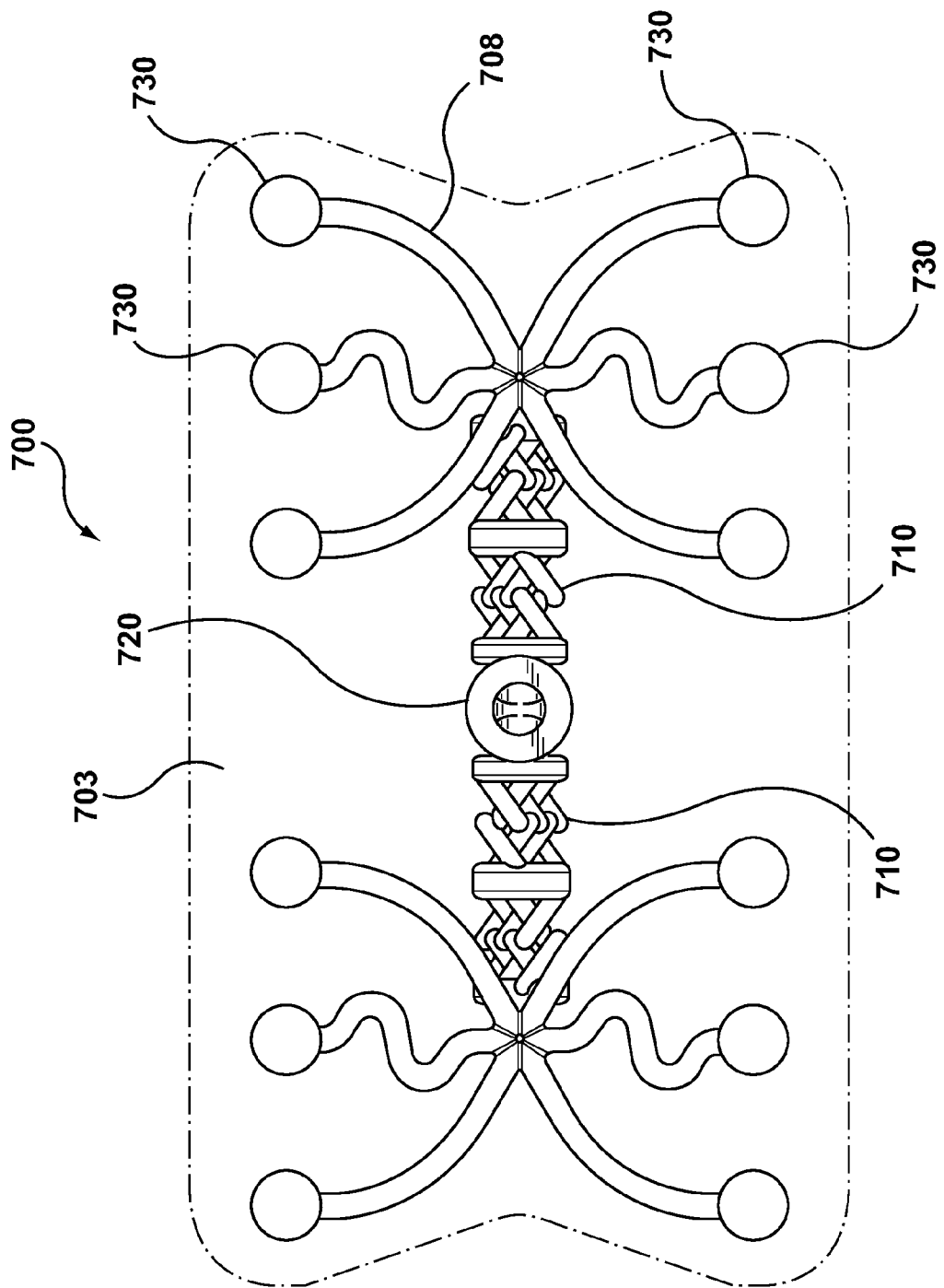
FIGS. 9-10 are schematic representations of yet another embodiment of a hot-runner system.
Figure 10:
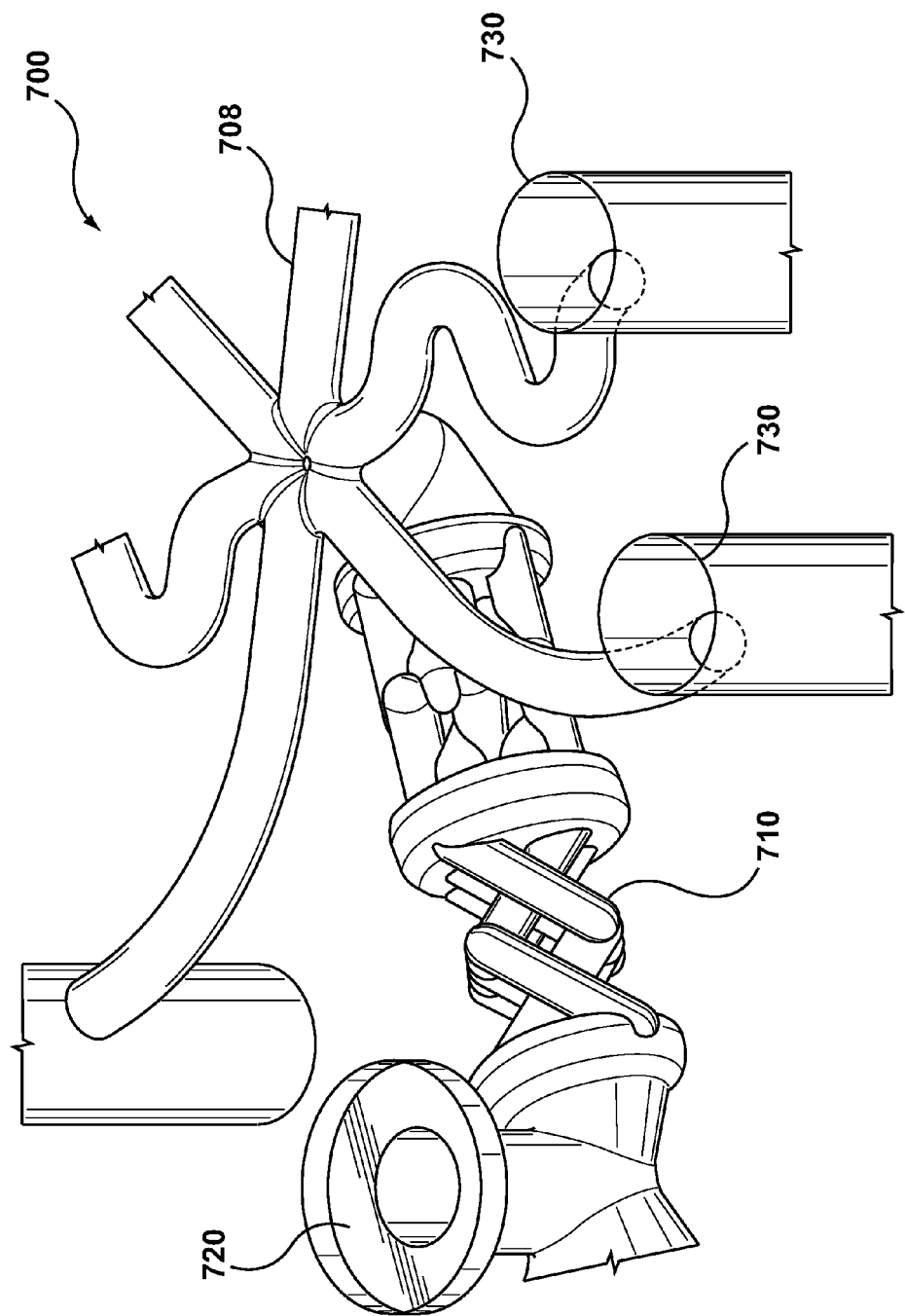
Figure 11:
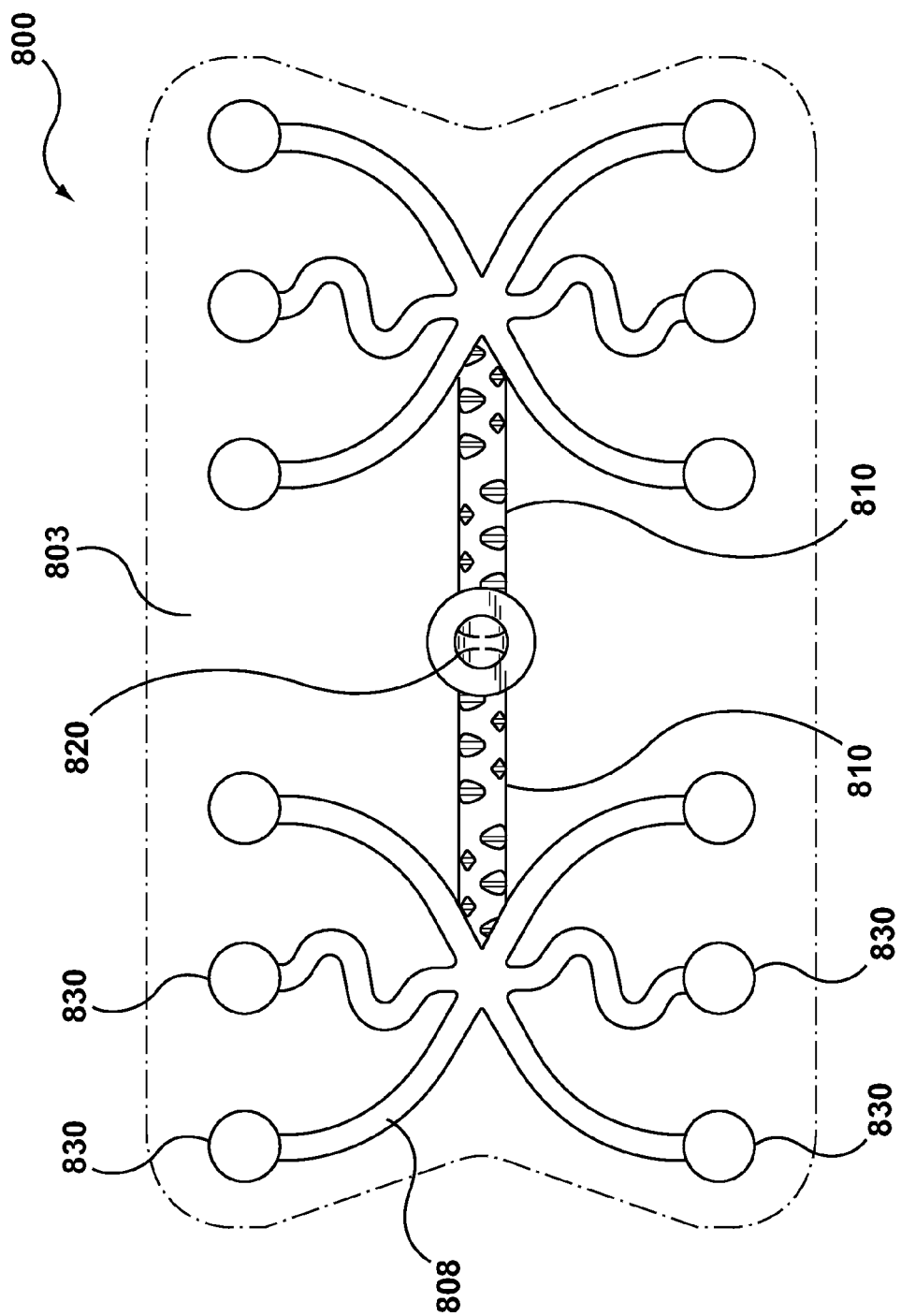
FIGS. 11-14 are schematic representations of another embodiment of a hot-runner system.
Figure 12:
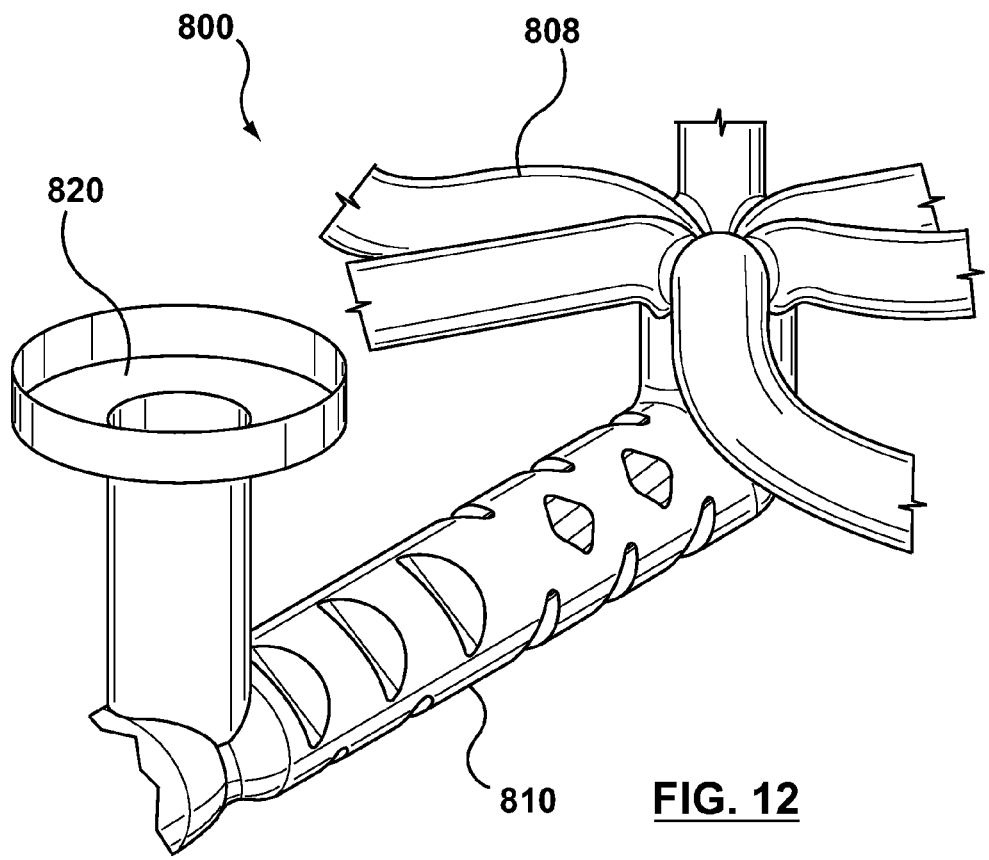
Figure 13:
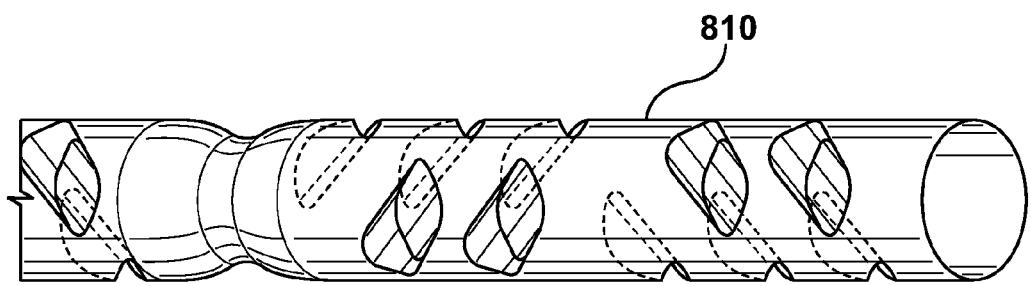
Figure 14:
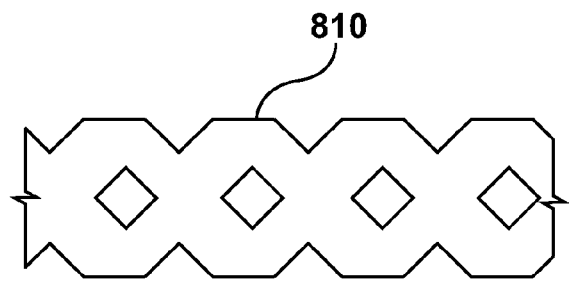

FIGS. 9-10 illustrate another embodiment of a hot-runner system (700). The hot-runner system (700) includes a manifold body (703) with an inlet (720) and a plurality of outlets (730), and a manifold melt channel (708) that extends between the inlet and the outlets. A plurality of melt-flow control structures (710) communicate with the manifold melt channel (708), and the melt-flow control structures (710) are integrally formed with the manifold body (703). In this embodiment, the melt-flow control structures (710) include an array of a plurality of zigzagging and/or substantially undulating channels that are configured to split the melt flow, mix/agitate the melt flow, and then recombine the melt flow to provide a more homogenous melt stream. Unlike the embodiment shown in FIG. 6, in this particular embodiment, the undulating channels of the melt flow control structures (710) are twisted in multiple locations to further mix/agitate the melt flow. As illustrated, in one embodiment, each twist is at least approximately 90°.

FIGS. 11-14 illustrate yet another embodiment of a hot-runner system (800). The hot-runner system (800) includes a manifold body (803) with an inlet (820) and a plurality of outlets (830), and a manifold melt channel (808) that extends between the inlet and the outlets. A plurality of melt-flow control structures (810) communicate with the manifold melt channel (808), and the melt-flow control structures (810) are integrally formed with the manifold body (803). In this embodiment, the melt-flow control structures (810) are substantially chevron shaped to provide a plurality of undulating channels that are configured to split the melt flow, mix/agitate the melt flow, and then recombine the melt flow to provide a more homogenous melt stream.

U.S. Pat. No. 7,198,400 is directed to additional melt flow control structures which are configured to mix the melt flow, and the '400 patent is herein incorporated by reference in its entirety. The '400 patent is directed to various melt flow control structures that are fabricated separately and thereafter inserted into the manifold body. However, the present invention contemplates integrally forming the melt flow control structures disclosed in the '400 patent with the manifold body.

It is noted that the foregoing has outlined some of the more pertinent non-limiting embodiments. Thus, although the description is made for particular arrangements and methods, the intent and concept of the aspects is suitable and applicable to other arrangements and applications. It will be clear to those skilled in the art that modifications to the disclosed embodiments can be effected without departing from the scope the independent claims. It is understood that the described embodiments are merely illustrative of the independent claims.

What is claimed is:

1. A hot-runner system, comprising:
a manifold body including a manifold melt channel; and
a melt-flow control structure communicating with the manifold melt channel,
wherein the melt-flow control structure is integrally formed with the manifold body.

2. The hot-runner system of claim 1, wherein:
the melt-flow control structure is configured to control, at least in part, a flow of melted resin through the manifold melt channel.

3. The hot-runner system of claim 2, further comprising:
a manifold assembly including the manifold body.

4. The hot-runner system of claim 3, wherein:
the manifold body includes:
a first manifold body portion;
a second manifold body portion being connectable with the first manifold body portion, the first manifold body portion and the second manifold body portion, together, defining the manifold melt channel when connected.

5. The hot-runner system of claim 4, wherein:
the melt-flow control structure is integrally formed with the first manifold body portion.

6. The hot-runner system of claim 4, wherein:
the melt-flow control structure is integrally formed with the second manifold body portion.

7. The hot-runner system of claim 4, wherein:
the melt-flow control structure is integrally formed with the first manifold body portion and the second manifold body portion.

8. The hot-runner system of claim 1, further comprising:
a functional insert located in the manifold body, the functional insert communicating with the manifold melt channel.

9. An injection-molding system including the hot-runner system of any one of claims 1 to 4.

10. The hot-runner system of claim 8, wherein the functional insert is integrally formed with the manifold body.

11. The hot-runner system of claim 8, wherein the functional insert comprises a mixer element.

12. The hot-runner system of claim 8, wherein the functional insert comprises a baffle element.

13. The hot-runner system of claim 1, wherein the melt-flow control structure is configured to improve a homogenous melt stream.

14. The hot-runner system of claim 1, wherein the melt-flow control structure is configured to improve a balancing of flow in the hot-runner system.

15. The hot-runner system of claim 1, wherein the melt-flow control structure is machined in multiple locations integrally with the manifold body.

16. The hot-runner system of claim 15, wherein the multiple locations of the melt-flow control structure have varying channel lengths and diameters.

17. The hot-runner system of claim 1, wherein the melt flow control structure is configured as a functional insert located in the manifold body, the functional insert communicating with the manifold melt channel.

18. The hot-runner system of claim 17, wherein the functional insert comprises a mixer element.

19. The hot-runner system of claim 17, wherein the functional insert comprises a baffle element.

* * * * *